Patented Jan. 15, 1929.

1,698,712

UNITED STATES PATENT OFFICE.

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT.

PROCESS FOR CONTROLLING THE VULCANIZATION OF RUBBER AND SIMILAR MATERIALS.

No Drawing. Original application filed June 25, 1923, Serial No. 647,757. Divided and this application filed November 1, 1927. Serial No. 230,387.

This invention relates to processes for controlling the vulcanization of rubber and similar materials such as balata, gutta percha and synthetic rubber, and products obtained thereby. It is more particularly directed to processes for checking such vulcanization of rubber or the like combined with a vulcanizing agent, a material containing carbon disulphide, zinc or equivalent metal in combination and an amine or any one or more of such substances, and causing vulcanization thereafter if desired; and to products obtained thereby.

The principal object of the present invention is to provide a process for checking the vulcanization of rubber which shall be simple and efficient, particularly in causing sure curbing or checking of vulcanization of rubber in any form including latex, cements or solid rubber whether applied to untreated rubber before vulcanization, to rubber containing one or more vulcanizing or other ingredients, or to rubber which has been partially or completely vulcanized while permitting easy resumption of vulcanization, at normal temperature 70° F. or above, say 212° F., or 240–286° F. later if desired. Another object of the invention is to provide a series of products resulting from such processes in which such control has been exercised and which therefore may be more readily manipulated in factory processes without danger of prevulcanization and which will result in rubber articles having improved physical charactertistics such as better resistance to ageing.

The invention accordingly comprises a process for controlling the vulcanization of rubber which includes causing a vulcanizing ingredient contained in rubber to react with a substance for checking the vulcanizing function of the ingredient and at will treating the rubber with an agent causing vulcanization, and the products obtained thereby.

The term "agent" as herein employed is intended to include both chemical substances and physical forces such as heat.

The term "vulcanizing ingredient" as employed herein is intended to include a substance which is a component part of any combination or mixture which is capable of vulcanizing rubber.

In accordance with copending application No. 574,780 filed July 13, 1922, continued in applications Nos. 41,875, filed July 6, 1925, 681,066, filed Dec. 17, 1923, and application No. 574,797, filed July 13, 1922, now Patent No. 1,463,794, it has been shown that vulcanization at ordinary temperatures, approximately 70° F., occurs when four ingredients, M in combination, an amine, a material comprising sulphur and a material comprising carbon disulphide or carbon oxysulphide are present. (Above the ordinary temperature, say ranging upwards to 212° F. or 240–286° F. vulcanization in the presence of these substances occurs at an increased rate.) M represents zinc or mercury in the mercuric state when vulcanization at ordinary temperatures, approximately 70° F., is carried out, and when vulcanization above ordinary temperatures, the preferred metals are the following:—zinc, mercury, preferably in the mercuric state, cadmium, copper, preferably in the cupric state, arsenic, preferably in the arsenous state, manganese, preferably in the manganous state, and lead, preferably in the plumbous state. It has been found in accordance with the present invention that the vulcanization accomplished by the presence of these ingredients may be controlled by controlling the vulcanizing function of any one of the ingredients by treating it, preferably in rubber, with a substance which reacts chemically therewith, preferably without removing the reaction product where solid rubber is employed although it may be removed later if desired, and that after such treament to check the function, the vulcanization may be carried on in the presence of the other ingredients by the application of heat or by replacing the ingredient which was reacted upon by the same or another quantity of the same ingredient or another similar ingredient. The control of vulcanization in the manner constituting the present invention is particularly important in its action to prevent the premature vulcanization of rubber compounds containing accelerators and other vulcanizing ingredients which vulcanize at ordinary temperatures or slightly above. Taking the process of vulcanization set forth in Cadwell's copending application, Ser. No. 441,691, filed February 1, 1921, in which rubber, zinc oxide, sulphur and oxy normal butyl thiocarbonic acid disulphide are combined and the compound so formed subsequently exposed to the vapors of aniline, constituting the fourth, i. e. amine ingredient, to effect vulcanization, of this compound without exposure to aniline or other amine be allowed to stand for a period of time at ordinary temperatures vulcanization is apt to occur, due it is believed to the action of the natural amine occuring in the rubber or to casual amine such as aniline picked up from the atmosphere of the factory, either of which may furnish the fourth ingredient required for vulcanization at ordinary temperature. The premature vulcanization mentioned occurs for instance in scrap rubber, that is pieces of rubber—usually small pieces—resulting from cutting or other processes for the manufacture of various rubber articles. By the present invention such premature vulcanization is avoided. If the premature vulcanization mentioned occurs it causes a serious loss of money in factory operations. Furthermore if vulcanized rubber is treated by the present process to check further vulcanization of the rubber, it has been found that further vulcanization substantially does not occur and thereby the ageing properties of the rubber are greatly improved. In addition it has been found that the process may be applied to various types of raw rubber to produce a uniformity of vulcanization therein, for example various lots of smoked sheet vulcanize it has been found at varying speeds. By the application of the present process these varying speeds may be changed to a uniform speed. The uniformity of speed of vulcanization is important in that vulcanized articles having a uniform degree of vulcanization may be automatically secured.

Instead of causing reaction with natural or casual amine to occur in a compound containing rubber, zinc in combination, sulphur and oxy normal butyl thiocarbonic acid disulphide, either zinc in combination or the carbon disulphide-containing material for example oxy normal butyl thiocarbonic acid disulphide may be treated with a suitable substance to check its vulcanizing function. Upon suitable treatment thereafter vulcanization may be accomplished.

In general in treating rubber containing vulcanizing ingredients, the following procedures may be employed:

1. For controlling the vulcanization by influencing the action of an amine or other basic nitrogenous matter constituting one of the four ingredients mentioned above, the amine may be rendered partially or totally inactive by treating it with an aldehyde of the aliphatic or aromatic series, such as formaldehyde, benzaldehyde, acetaldehyde etc. or may be treated with an acid anhydride such as phthalic anhydride, or with nitroso bodies such as para nitrosodimethylaniline, nitroso beta napthol, para nitrosodimethylaniline, or quinone, or similar materials and other bodies having similar properties. These substances lower the basicity of the amine of other basic nitrogenous matter present. Where the amine or other basic nitrogenous matter is not one of the four ingredients but is used for example with zinc in combination and sulphur, the treatment with aldehyde actually increases the activity of the amine. But treatment with an anhydride such as phthalic anhydride or nitroso bodies or quinone or other bodies having similar properties checks the vulcanizing function of the amine.

2. For controlling the vulcanization by influencing the action of the carbon disulphide-containing material, an excess of either an aliphatic amine or ammonia or hydrogen sulphide may be employed. The amine employed should be a primary amine.

3. For controlling the vulcanization by influencing the action of the zinc or similar metal, hydrogen sulphide may be employed or similar substance to form a less active compound. The zinc sulphide formed when hydrogen sulphide is used is a less active form of zinc in combination.

4. For controlling vulcanization by influencing the action of sulphur where sulphur constitutes one of the four ingredients mentioned above various unsaturated bodies may be employed such as palm oil, rosin and pine tar.

The substances for controlling the vulcanizing functions of these various vulcanizing ingredients leave the rubber substantially unchanged physically. The rubber may be employed in various states such as latex, raw rubber, or products intermediate between latex and raw rubber, such as rubber sponge, as set forth in United States patents of Ernest Hopkinson, 1,423,525 and 1,423,526; rubber which has been compounded and is ready for vulcanization and partially or fully vulcanized rubber. The treatment with the various materials mentioned above may be accomplished in various ways, such as by mixing mechanically with the rubber either by milling or similar process or by stirring in latex or cement. Or the various substances either in the gaseous, liquid or solid state may be absorbed by latex, raw rubber, rubber sponge, cements or vulcanized or vulcanizing rubber.

This application is a division of Serial

No. 647,757, filed June 25, 1923, and it relates to checking the vulcanization in plies of rubber.

The following example serves to illustrate one method of carrying out the invention:

A compound made up of 100 parts of rubber, 10 parts of zinc oxide, 4 parts of oxy normal butyl thiocarbonic acid disulphide, 2 parts of sulphur and 0.1 part of phthalic anhydride is prepared in the form of a sheet 0.03 of an inch thick. The phthalic anhydride checks the functioning of any naturally occurring or casual amine in the compound so that premature vulcanization does not occur. A compound consisting of 100 parts of rubber, 10 parts of zinc oxide, 2 parts of sulphur and 4 parts of dibenzylamine is milled in the usual manner and sheeted out to a thickness of 0.03 inch. The two compounds are united in alternate layers in a similar manner to that set forth in my copending application last mentioned above. The amine from the compound penetrates into the oxy normal butyl thiocarbonic acid disulphite compound, neutralizing any excess of phthalic anhydride that may remain and activating the oxy normal butyl thiocarbonic acid disulphide to cause vulcanization. The oxy normal butyl thiocarbonic acid disulphide penetrates into the amine compound where it reacts with the zinc oxide, sulphur and amine to cause vulcanization.

Instead of phthalic anhydride in the above example, benzaldehyde, acetaldehyde, or other aldehydes may be employed in a similar manner or nitroso compounds such as para nitroso dimethyl aniline and other similar bodies may be used. Those of the materials which are liquids may be applied by painting the amine containing stock or by immersing the stock in the compound or by diffusion of the vapors of the compound into the stock.

The example is illustrative of one method of carrying out the inventon but obviously other rubber compounds may be employed and various ingredients may be present provided that vulcanization can be accomplished by the migration of at least one of the necessary ingredients into the adjoining ply which does not contain that particular ingredient.

Instead of oxy normal butyl thiocarbonic acid disulphide mentioned in any of the above examples, the following vulcanizing ingredients may be substituted to be treated by the processes before mentioned herein: Zinc butyl xanthogenate, thiobenzoylmonosulphide, oxy ethylthiocarbonic acid disulphide and zinc dithiobenzoate in compounds or cements. The proportion of each of these materials preferably employed is as follows: 100 parts of rubber, 10 parts of zinc oxide, 3 parts of sulphur and from 0.1 to 3 parts of the zinc butyl xanthogenate, thiobenzoylmonosulphide, oxy ethylthiocarbonic acid disulphide or zinc dithiobenzoate.

It will be observed that oxy normal butyl thiocarbonic acid disulphide, zinc dithiobenzoate, zinc butyl xanthogenate, thiobenzoylmonosulphide, oxy ethylthiocarbonic acid disulphide are representatives of a large class of materials whose action may be controlled in a manner similar to that above set forth. This class of materials includes thiol salts, disulphides and monosulphides some of which are set forth in my Patents 1,440,963, 1,440,964, 1,440,961, and my applications Ser. Nos. 548,828, 548,829, 548,831, now issued as U. S. Patents 1,532,226, 1,532,227, and 1,510,652, respectively. In the patents herein mentioned and in general where it is desired to control the vulcanization of rubber by chemically treating vulcanizing ingredients or particularly where it is desired to control the vulcanization of rubber containing sulphur and amine, zinc or equivalent metal, carbon disulphide or materials containing the group $\overset{CS}{\underset{X}{\|}}$ where X represents sulphur or a substitute element or group the processes herein set forth may be employed.

The processes herein set forth are simple and efficient. They cause either partial or complete stoppage of vulcanization when applied to the various types of rubber employed containing one or more vulcanizing ingredients. They permit easy resumption of vulcanization later, if desired. Furthermore a uniform rate of vulcanization may be established for different lots of raw rubbers such as smoked sheet by the processes described. The products resulting from the process may be manipulated without fear of premature vulcanization and as a result the difficulty of producing scrap rubber in factory operations which vulcanized before it could be reformed into articles and which represented accordingly a loss has been done away with. Products in which over-vulcanization has been prevented by the processes herein included have a correspondingly increased resistance to ageing.

Having thus described my invention what I claim and desire to protect by Letters Patent is:

1. Process for controlling the vulcanization of rubber which comprises preparing a compound containing a metal M in combination, sulphur, a carbon disulphide containing material, preparing a second compound consisting of rubber, a metal M in combination, a material containing sulphur, and an amine, one of said compounds containing a material to check the vulcanizing action of at least one of the four ingredients, a metal M in combination, sulphur, carbon disulphide containing material and amine, bringing the compounds together in the form of plies, permitting the amine and carbon disulphide material to diffuse throughout the two compounds, and vulcanizing the rubber.

2. Process for controlling the vulcanization of rubber which comprises preparing a compound containing a metal M in combination, sulphur, a carbon disulphide containing material, and a substance to check premature vulcanization due to casual amine, preparing a second compound consisting of rubber, metal M in combination, a material containing sulphur, and an amine, bringing the compounds together in the form of plies, permitting the amine and carbon disulphide containing material to diffuse throughout the two compounds, and vulcanizing the rubber.

3. Process for controlling the vulcanization of rubber which comprises preparing a compound containing zinc in combination, sulphur, a carbon disulphide containing material, and a substance to check premature vulcanization due to casual amine, preparing a second compound consisting of rubber, zinc in combination, a material containing sulphur, and an amine, bringing the compounds together in the form of plies, permitting the amine and carbon disulphide containing material to diffuse throughout the two compounds, and vulcanizing the rubber.

4. A process for controlling the vulcanization of rubber which comprises preparing a compound containing zinc in combination, sulphur, a carbon disulphide-containing material and an acid anhydride, preparing a second compound consisting of rubber, zinc in combination, a material containing sulphur and an amine, bringing the compounds together in the form of plies, permitting the amine and carbon disulphide-containing material to diffuse throughout the two compounds, and vulcanizing the rubber.

5. A process for controlling the vulcanization of rubber which comprises preparing a compound containing zinc in combination, sulphur, a carbon disulphide-containing material and phthalic anhydride, preparing a second compound consisting of rubber, zinc in combination, a material containing sulphur and an amine, bringing the compounds together in the form of plies, permitting the amine and carbon disulphide-containing material to diffuse throughout the two compounds and vulcanizing the rubber.

Signed at New York, county and State of New York, this 26th day of October, 1927.

SIDNEY M. CADWELL.